United States Patent
So et al.

(10) Patent No.: US 6,556,244 B1
(45) Date of Patent: Apr. 29, 2003

(54) ACTIVE PIXEL SENSOR WITH ELECTRONIC SHUTTER

(75) Inventors: Hwang-Young So, Kyungki-Do (KR); Ghun-Jung Lee, Seoul (KR)

(73) Assignee: Hyundai Electronics Industries Co., Ltd., Ichon-Shi (KR)

( * ) Notice: Subject to any disclaimer, the term of this patent is extended or adjusted under 35 U.S.C. 154(b) by 0 days.

(21) Appl. No.: 09/140,328

(22) Filed: Aug. 26, 1998

(30) Foreign Application Priority Data

Sep. 25, 1997 (KR) .......................................... 97-48824

(51) Int. Cl.[7] .......................... H04N 3/14; H04N 5/335
(52) U.S. Cl. ...................... 348/296; 348/297; 348/301; 348/303; 348/308
(58) Field of Search ................................ 348/296, 229, 348/301, 297, 300, 302, 303, 304, 305, 306, 307, 308, 309, 310, 311

(56) References Cited

U.S. PATENT DOCUMENTS

| | | | |
|---|---|---|---|
| 4,839,735 A | | 6/1989 | Kyomasu et al. ....... 352/213.31 |
| 5,401,952 A | * | 3/1995 | Sugawa ....................... 348/308 |
| 5,471,515 A | | 11/1995 | Fossum et al. ................ 377/60 |
| 5,539,460 A | * | 7/1996 | Tamura ....................... 348/296 |
| 5,598,210 A | * | 1/1997 | Toohey ....................... 348/296 |
| 5,898,168 A | * | 4/1999 | Gowda et al. .............. 348/311 |
| 5,900,623 A | * | 5/1999 | Tsang et al. ............. 250/208.1 |
| 5,929,908 A | * | 7/1999 | Takahashi et al. .......... 348/364 |
| 5,962,844 A | * | 10/1999 | Merrill et al. ............ 250/208.1 |
| 6,141,050 A | * | 10/2000 | Ackland et al. ............. 348/308 |
| 6,271,880 B1 | * | 8/2001 | Kameshima et al. ........ 348/303 |
| 6,369,853 B1 | * | 4/2002 | Merrill et al. .............. 348/308 |

FOREIGN PATENT DOCUMENTS

| | | |
|---|---|---|
| DE | 196 26 427 A1 | 1/1997 |
| JP | 6-98 080 A | 4/1994 |
| JP | 08009268 A * | 1/1996 .......... H04N/5/335 |

OTHER PUBLICATIONS

"Integrated Electronic Shutter for Back Illuminated Charge–Coupled Devices", IEEE Transactions on Electronic Devices, vol. 4 No. 7, Reich et al., Jul. 1993, pp. 1231–1237.*

"A 128x128 Pixel Standard–CMOS Image Sensor with Electronic Shutter", IEEE Journal of Solid–State Circuits, vol. 31, No. 12 Aw et al., Dec. 1996, pp. 1922–1930.*

A W, Chye Huat and Bruce A. Wooley, "A 128 X 128–Pixel Standard–CMOS Image Sensor with Electronic Shutter," IEEE Journal of Solid–State Circuits, vol. 31, No. 12, Dec. 1996.

* cited by examiner

Primary Examiner—Wendy R. Garber
Assistant Examiner—John Villecco
(74) Attorney, Agent, or Firm—Fleshner & Kim, LLP

(57) ABSTRACT

An active pixel sensor (APS) with an electronic shutter is provided that performs an auto exposure function so that all pixels have substantially equal photosensitive time by controlling a photo-electric charge that is generated in accordance with light transmitted to a photo-diode. The APS includes a switching unit that throughputs the photo-electric charge for a prescribed time based on an externally inputted shutter control signal, and an electric charge storing unit that stores the photo-electric-charge from the switching unit for the prescribed time. The electric charge storing unit outputs the stored photo-electric charge to an electric charge amplifying and outputting unit based on an externally inputted electric charge resetting signal. The APS provides uniform screen brightness for a display apparatus by allowing all pixels to use a substantially identical photosensitive (e.g., exposure) time.

13 Claims, 2 Drawing Sheets

FIG. 3A SHUTTER CONTROL SIGNAL
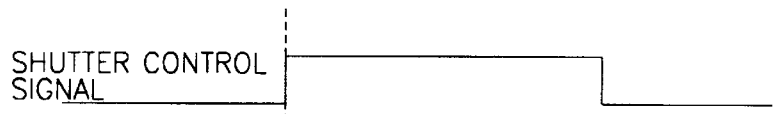
FIG. 3B RESET, ELECTRIC CHARGE RESET SIGNAL
FIG. 4A BLK
FIG. 4B VD
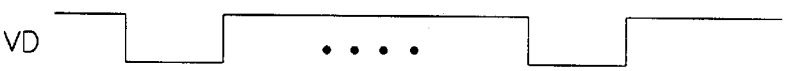
FIG. 4C HD
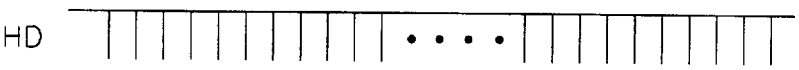
FIG. 5A BLK
FIG. 5B SHUTTER CONTROL SIGNAL
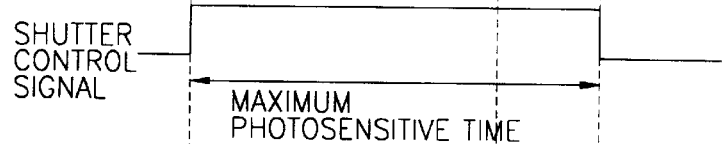
MAXIMUM PHOTOSENSITIVE TIME
FIG. 5C SHUTTER CONTROL SIGNAL
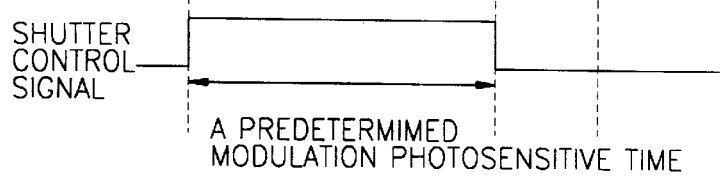
A PREDETERMIMED MODULATION PHOTOSENSITIVE TIME

ACTIVE PIXEL SENSOR WITH ELECTRONIC SHUTTER

BACKGROUND OF THE INVENTION

1. Field of the Invention

The present invention relates to an active pixel sensor (APS) and in particular, to an active pixel sensor (APS) with an electronic shutter.

2. Background of the Related Art

Generally, an active pixel sensor (APS) is formed of two-dimensional sensor arrangements by which an address designation is made. As shown in FIG. 1, a related art APS includes a photo-diode D1 connected with a ground circuit and that generates a photo-electric charge based on an externally transmitted light. An NMOS transistor M1 has a drain connected with the photo-diode D1, a source that receives a power voltage Vdd, and a gate that receives a reset signal RESET. The NMOS transistor M1 is for discharging an internal electric charge of the photo-diode D1 in accordance with the reset signal RESET. An NMOS transistor M2 has a gate connected with the drain of the NMOS transistor M1 that receives a photo-electric charge from the photo-diode D1. The NMOS transistor M2 has a source that receives a power voltage Vdd to amplify the electric charges from the photo-diode D1. An NMOS transistor M3 has a source connected with the drain of the NMOS transistor M2 and a gate that receives an externally inputted row selection signal for outputting a pixel data in accordance with the row selection signal.

The reset signal RESET is inputted from an external signal source into all pixels, respectively, in order to discharge an electric charge from the photo-cell (e.g., photodiode). The row selection signals are sequentially inputted from an externally connected row decoder. In this fashion, each pixel is selected.

The operation of the related art APS will now be explained with reference to FIG. 1. When a high level reset signal RESET is inputted into the gate of the first NMOS transistor M1, the first NMOS transistor M1 is turned on. The internal electric charge of the photo-diode D1, which is generated in accordance with an externally transmitted light, is discharged and the first NMOS transistor M1 is turned off.

Thereafter, the photo-diode D1 receives externally transmitted light for a predetermined photosensitive time and generates a photo electric charge. In addition, the photo-electric charge (i.e., image signal) generated by the photo-diode D1 for a predetermined photo-electric charge time (i.e., the photosensitive time) is applied to the gate of the second NMOS transistor M2. The second NMOS transistor M2 amplifies the photo-electric charge (i.e., image signal) and outputs the amplified photo-electric charge to the third NMOS transistor M3.

The third NMOS transistor M3 externally outputs the photo-electric charge (image signal), which was amplified by the second NMOS transistor M2, in accordance with a high level row selection signal applied to its gate. Then, the high level reset signal RESET is applied to the gate of the first NMOS transistor M1, and the output signal from the first NMOS transistor M1 discharges the photo-electric charge generated by the photo-diode D1, so that each pixel returns to an initial state.

The above-described operations are repeated in the related art APS to externally output a photo-electric charge (image signal) as a pixel data. In the related art APS, when the column lines (not shown) of the pixels are selected by an external column decoder (not shown), and a photo-electric charge (image signal) is outputted to an externally connected display apparatus (television or monitor) as data of the pixels.

In the related art APS, a photosensitive time can be determined by generating a reset signal before a row selection signal is applied by controlling the period of the reset signal. In view of the photosensitive time with respect to all pixels however, the related art control method has various problems. In related art, a desired photosensitive time is obtained with respect to only a predetermined pixel. Therefore, since in the APS the pixel data are continuously read and outputted, the other pixels have different photosensitive times. Accordingly, a uniform screen brightness of a display apparatus for the related art APS is difficult or impossible to achieve.

SUMMARY OF THE INVENTION

An object of the present invention to provide an active pixel sensor (APS) with an electronic shutter that substantially overcomes at least one of the aforementioned problems or disadvantages encountered in the related art.

Another object of the present invention to provide an APS with an electronic shutter that performs an auto exposure function so that pixels have substantially equal photosensitive times.

Another object of the present invention is to provide an APS that controls a photoelectric charge, which is generated based on light transmitted to a photo-diode.

Another object of the present invention is to provide an APS that has an electric shutter performing an electronic shutter function and an auto exposure function.

Another object of the present invention is to provide an APS that enables a uniform screen brightness of a display apparatus.

To achieve at least the above objects in a whole or in parts, there is provided an active pixel sensor with an electronic sensor according to the present invention that includes a switching unit that passes through a photo-electric charge for a prescribed time in accordance with an externally inputted shutter control signal, and an electric charge storing service that stores the photo-electric charge from the switching unit and outputs the stored photo-electric charge to an output device in accordance with an externally inputted electric charge resetting signal, whereby all pixels have substantially identical photosensitive times.

To further achieve at least the above objects in a whole or in parts, there is provided an active pixel sensor with an electronic sensor according to the present invention that includes a fourth transistor having a source coupled with a drain of a first transistor and coupled to an output of a photo-diode, and a gate that receives a shutter control signal, wherein the fourth transistor is switched in accordance with the shutter control signal, and a fifth transistor having a drain respectively coupled to a drain of the fourth transistor and a gate of a second transistor, a source coupled to a ground, and a gate that receives an electric charge resetting signal, wherein the fifth transistor stores an electric charge outputted from the photo-diode through the fourth transistor and outputs the stored electric charge to the gate of the second transistor.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3A is a diagram illustrating a reset signal and electric charge reset signal waveforms in the circuit of FIG. 2;

FIG. 3B is a diagram illustrating a shutter control signal waveform in the circuit of FIG. 2;

FIGS. 4A through 4C are diagrams illustrating television synchronous signals in the circuit of FIG. 2, of which:

FIG. 4A is a diagram illustrating a blank signal waveform;

FIG. 4B is a diagram illustrating a vertical synchronous signal waveform of a television; and FIG. 4C is a diagram illustrating a horizontal synchronous signal waveform of a television; and FIGS. 5A through 5C are diagrams illustrating modulated shutter control signals in the circuit of FIG. 2, of which:

FIG. 5A is a diagram illustrating a blank signal;

FIG. 5B is a diagram illustrating a shutter control signal with respect to the maximum photosensitive time; and FIG. 5C is a diagram illustrating a shutter control signal with respect to a predetermined modulation photosensitive time.

DETAILED DESCRIPTION OF PREFERRED EMBODIMENTS

Figure 1:
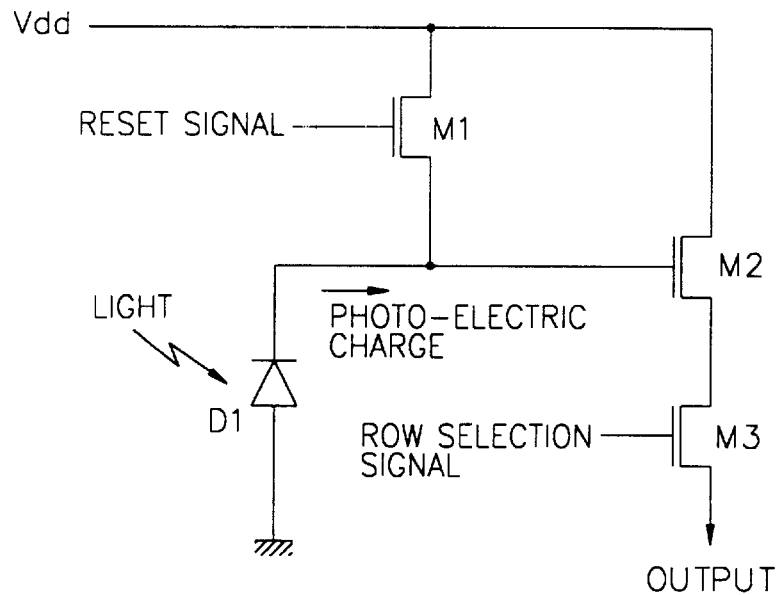
FIG. 1 is a circuit diagram illustrating a related active pixel sensor.
Figure 2:
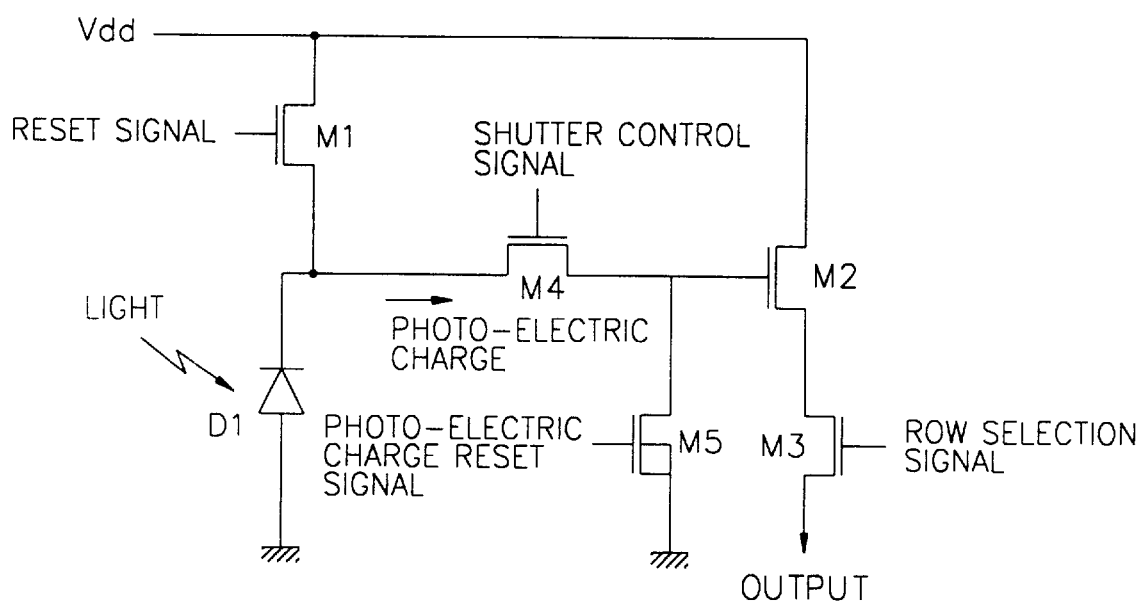
FIG. 2 is a circuit diagram illustrating a preferred embodiment an active pixel sensor according to the present invention.

FIG. 2 illustrates a preferred embodiment of an active pixel sensor (APS) according to the present invention. As shown therein, the active pixel sensor includes a photo-diode D1 and first through fifth NMOS transistors M1–M5. The photo-diode D1 has one end coupled with ground and generates a photo-electric charge in accordance with incident light. The first NMOS transistor M1 has its drain coupled with the other end of the photo-diode D1, its source receives a power voltage Vdd, and its gate receives a reset signal RESET for discharging an internal electric charge from the photo-diode D1. The second NMOS transistor M2 has its source receiving the power voltage Vdd for amplifying a photo-electric charge inputted through its gate. The third NMOS transistor M3 has its source coupled with the drain of the second NMOS transistor M2 and its gate receives a row selection signal for externally outputting the photo-electric charge, which is amplified by the second NMOS transistor M2, in accordance with the row selection signal.

The fourth NMOS transistor M4 of the preferred embodiment of the APS according to the present invention has its source coupled with the drain of the first NMOS transistor M1 and receives the photo-electric charge from the photo-diode D1. The gate of the fourth NMOS transistor M4 receives an externally generated shutter control signal for being switched in accordance with the shutter control signal. The fifth NMOS transistor has its drain coupled with the drain of the fourth NMOS transistor M4 and the gate of the second NMOS transistor M2. The source of the fifth NMOS transistor M5 is coupled with ground, and its gate receives an externally generated photo-electric charge reset signal CHARGE RESET for storing the electric charges from the photo-diode D1 through the fourth NMOS transistor M4. The fifth NMOS transistor M5 also outputs the stored electric charges from the photo-diode D1 to the gate of the second NMOS transistor M2.

The reset signal RESET is outputted from an external signal source so that the electric charges generated by the photo-cells are discharged to all pixels. The row selection signals are sequentially received from an externally coupled row decoder (not shown) so that each cell is selected thereby. In addition, the photo-electric charge reset signal CHARGE RESET is outputted from an externally coupled signal source so that the electric charges stored in the fifth NMOS transistor M5 are discharged. The reset signal RESET can be used as a photo-electric charge reset signal CHARGE RESET.

Operations of the preferred embodiment of the active pixel sensor (APS) with an electric shutter according to the present invention will now be described. When the reset signal RESET as shown in FIG. 3B is inputted into the gate of the first NMOS transistor M1, the first NMOS transistor M1 is turned on. The internal electric charges charged in the photo-diode D1 are discharged based on an output signal from the first NMOS transistor M1, and the first NMOS transistor M1 is turned off. The internal electric charges charged in the photo-diode D1 are discharged so that the electric charges are stored in the photo-diode D1 only from a prescribed photosensitive time.

When a high level shutter control signal as shown in FIG. 3A is applied from an externally coupled shutter controller (not shown) to the gate of the fourth NMOS transistor M4, the fourth NMOS transistor M4 is turned on thereby. The photo-electric charges (e.g., image signal) generated by the photo-diode D1 in accordance with light made incident thereto are stored between the gate and the source of the fifth NMOS transistor M5 through the fourth NMOS transistor M4 while the shutter control signal maintains the high level. The fifth NMOS transistor M5 acts as a capacitor. The time while the shutter control signal maintains the high level becomes a prescribed photosensitive time.

The photo-electric charges generated by the photo-diode D1 are stored in the fifth NMOS transistor M5 during the photosensitive time. When the shutter is turned off the shutter control signal becomes a low level. The fourth NMOS transistor M4 is turned off, and the photo-electric charges stored in the fifth NMOS transistor M5 are not influenced by the electric charges generated by the photo-diode D1.

The photo-electric charges stored in the fifth NMOS transistor M5 are amplified by the second NMOS transistor M2. The third NMOS transistor M3, which is turned on in accordance with a row signal from an externally coupled row decoder (not shown), outputs the photo-electric charge amplified by the second NMOS transistor M2 to an externally coupled display apparatus (not shown) such as a display screen.

The electric charge reset signal CHARGE RESET as shown in FIG. 3B is externally applied to the gate of the fifth NMOS transistor M5, and the internal electric charges of the fifth NMOS transistor M5 are discharged. At this time, the reset signal RESET can be used as the electric charge reset signal CHARGE RESET applied to the gate of the fifth NMOS transistor M5.

The above-described process that obtains an output from the APS of incident light into the photo-diode D1 accumulated during a prescribed photosensitive time is called one period. The on-off time of the shutter is also the photosensitive time of the pixel. In addition, the photo-electric charges generated by each pixel can be outputted to an externally coupled display apparatus such as a television or a monitor (not shown) as an output of each pixel.

In the preferred embodiment according to the present invention, during one period for obtaining the outputs of the pixels, all pixels have the identical photosensitive time (exposure time). The photo-electric charges corresponding the photosensitive time are stored into the fifth NMOS transistor M5 until each pixel is selected by the externally coupled row decoder and column decoder. When each pixel is sequentially selected by the externally coupled row decoder after each column is selected by the externally coupled column decoder, the pixel data (photo-electric charges) stored in the fifth NMOS transistor M5 are outputted.

In this case, the photosensitive time (exposure time) is determined in accordance with the shutter control time, which is applied from the externally coupled shutter controller (not shown) to the fourth NMOS transistor M4. The photosensitive time is controlled by varying the pulse width of the shutter control signal, which is applied to the gate of the fourth NMOS transistor M4 that performs as a shutter so that all pixels have an identical exposure time (photosensitive time). Thus, all pixels are identically controlled.

Methods for controlling the shutter control signals will now be described. FIGS. 4A through 4C are diagrams that illustrate TV synchronous signals. FIG. 4A illustrates a vertical blank signal BLK by which a scanning line of TV does not appear, FIG. 4B illustrates a vertical synchronous signal VD of TV, and FIG. 4C illustrates a horizontal synchronous signal HD of TV.

The externally coupled shutter controller (not shown) uses the vertical blank signals BLK shown in FIGS. 4A and 5A so that the scanning lines of TV do not appear. When the vertical blank signals are low level, the scanning lines do not appear. In the interval when the vertical blank signals BLK are low level, the shutter control signal is preferably outputted in accordance with a data signal from an externally coupled microcomputer (not shown) while the vertical blank signal BLK is enabled. The shutter control signal as shown in FIGS. 5B and 5C can be modulated.

The pulse width of the shutter control signal is varied in accordance with the data from the externally coupled microcomputer (not shown). The pulse width of the shutter control signal becomes a reference that can be used to determine how long the photo cells receive light (e.g., images). The shutter speed is determined in accordance with the pulse width. Thus, the photosensitive time (exposure time) is controlled based on the time (shutter time) during which the fourth NMOS transistor M4 is turned on/off in accordance with a shutter control signal applied from an externally connected shutter controller (not shown).

In the APS according to the preferred embodiment of the present invention, each column is selected by an externally coupled column decoder, and each of the pixels is sequentially selected by an externally coupled row decoder to output a pixel data. In each pixel, the photo-electric charges generated by the photo diode for a prescribed photosensitive time are initially stored then are outputted therefrom. The prescribed photo-sensitive time photo-electric charges are stored into a transistor (e.g., the fifth NMOS transistor). Thus, an uniform screen brightness can be obtained for each pixel (e.g., for a coupled display apparatus).

As described above, in the preferred embodiment of the present invention the photosensitive time is controlled by a shutter control signal so that all pixels have the identical photosensitive time. Therefore, it is possible to obtain a uniform screen brightness for a externally coupled TV monitor or the like. In addition, it is possible to enable a desired auto exposure function for a camera, which is also applicable to a digital camera such as a digital movie camera.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An active pixel sensor comprising:
   a sensor that generates a charge;
   a first transistor that discharges the sensor based on a first signal;
   a second transistor that receives and amplifies the charge;
   a third transistor that outputs the amplified charge from the second transistor in accordance with a second signal;
   a fourth transistor coupled to.the sensor that passes the charge based on a third signal; and
   a fifth transistor that receives a fourth signal and is respectively coupled to the fourth transistor and the second transistor, wherein the fifth transistor receives and stores the charge passed from the sensor through the fourth transistor, and wherein the fifth transistor outputs the stored charge to the second transistor based on the fourth signal, wherein the second transistor has a first electrode coupled to a second prescribed voltage, and a control electrode coupled to the second electrodes of the fourth and fifth transistors.

2. The active pixel sensor of claim 1, wherein said fourth transistor operates as an electronic shutter, and wherein the fourth signal is a shutter control signal that is modulated during a prescribed interval.

3. The active pixel sensor of claim 2, wherein the prescribed interval is an enabled vertical blank signal of a TV synchronous signal.

4. The active pixel sensor of claim 3, wherein in the shutter control signal is generated by a shutter controller with a shutter speed based on a data signal.

5. The active pixel sensor of claim 1, wherein the sensor is a photo-diode, and wherein said fifth transistor only stores a photo-electric charge generated by incident light to the photo-diode during a photosensitive time based on the third signal.

6. The active pixel sensor of claim 5, wherein the photosensitive time is proportional to a width of a high level third signal.

7. The active pixel sensor of claim 1, wherein the first signal discharges the charge generated by the sensor and the fourth signal discharges the stored charge in the fifth transistor, and wherein the first signal is used as the fourth signal.

8. The active pixel sensor of claim 1, wherein the light sensor is a photo-diode, wherein the photo-diode is coupled to a first prescribed voltage, and wherein the first transistor has a second electrode coupled to the photo-diode, a first electrode coupled to a second prescribed voltage and a gate that receives the first signal.

9. The active pixel sensor of claim 1, wherein the third transistor has a first electrode coupled to a second electrode of the second transistor and a control electrode that receives the second signal.

10. The active pixel sensor of claim 1, wherein the fourth transistor has a first electrode coupled to the sensor and the second electrode of the first transistor, and a control electrode coupled to the third signal.

11. The active pixel sensor of claim 1, wherein the fifth transistor has a second electrode coupled to a second electrode of the fourth transistor and a control electrode of the second transistor, a first electrode coupled to a first voltage potential, and a control electrode that receives the fourth signal.

12. The active pixel sensor of claim 1, wherein the first prescribed voltage is a ground voltage and a second prescribed voltage is a power voltage, wherein the first signal is a reset signal, the second signal is a row selection signal, the third signal is a shutter control signal and a fourth signal is an electric charge reset signal, and wherein the first through fifth transistors are NMOS transistors.

13. The active pixel sensor of claim 1, further comprising a plurality of sensors, wherein each of the sensors have a substantially equal exposure time based on the fourth signal.

* * * * *